US011855260B2

(12) United States Patent
Song et al.

(10) Patent No.: US 11,855,260 B2
(45) Date of Patent: Dec. 26, 2023

(54) NONINCENDIVE ELECTROLYTE FOR LITHIUM SECONDARY BATTERY, AND LITHIUM SECONDARY BATTERY INCLUDING SAME

(71) Applicant: The Industry & Academic Cooperation in Chungnam National University (IAC), Daejeon (KR)

(72) Inventors: Seung-Wan Song, Sejong-si (KR); Kihun An, Daejeon (KR); Sehyun Kwak, Daejeon (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 231 days.

(21) Appl. No.: 17/367,956

(22) Filed: Jul. 6, 2021

(65) Prior Publication Data
US 2022/0013811 A1   Jan. 13, 2022

(30) Foreign Application Priority Data
Jul. 8, 2020   (KR) .......................... 10-2020-0083961

(51) Int. Cl.
*H01M 10/0569* (2010.01)
*H01M 10/0525* (2010.01)

(52) U.S. Cl.
CPC ... *H01M 10/0569* (2013.01); *H01M 10/0525* (2013.01); *H01M 2300/0034* (2013.01); *H01M 2300/0042* (2013.01)

(58) Field of Classification Search
None
See application file for complete search history.

(56) References Cited

U.S. PATENT DOCUMENTS

2020/0335825 A1* 10/2020 Hancock ........... H01M 10/0569
2022/0384848 A1* 12/2022 Borrero ................. C07C 68/065

FOREIGN PATENT DOCUMENTS

| JP | 2003-346899 A | 12/2003 |
| JP | 2003346899 A | * 12/2003 |
| KR | 10-2009-0102821 A | 9/2009 |
| KR | 10-2016-0011548 A | 2/2016 |

OTHER PUBLICATIONS

Machine translation of JP-2003346899-A. (Year: 2023).*
Communication dated Mar. 16, 2022 from the Korean Patent Office in Korean Application No. 10-2020-0083961.

* cited by examiner

*Primary Examiner* — Eli S Mekhlin
(74) *Attorney, Agent, or Firm* — Sughrue Mion, PLLC

(57) ABSTRACT

Disclosed is a nonincendive electrolyte for lithium secondary battery, the electrolyte using an organic solvent mixture including a first solvent containing fluorine and sulfur, a second solvent that is a linear carbonate-based compound containing fluorine, a third solvent that is a linear ester-based compound containing fluorine, and a fourth solvent that is a cyclic carbonate-based compound. Thus, the electrolyte is nonflammable or flame-retardant, thereby preventing a lithium secondary battery from catching on fire or exploding. That is, the electrolyte greatly improves the safety of a lithium secondary battery, allows the high voltage charge of a lithium secondary battery, and prevents the degradation of battery performance of a lithium secondary battery. In addition, a lithium secondary battery including the electrolyte is disclosed.

9 Claims, 1 Drawing Sheet

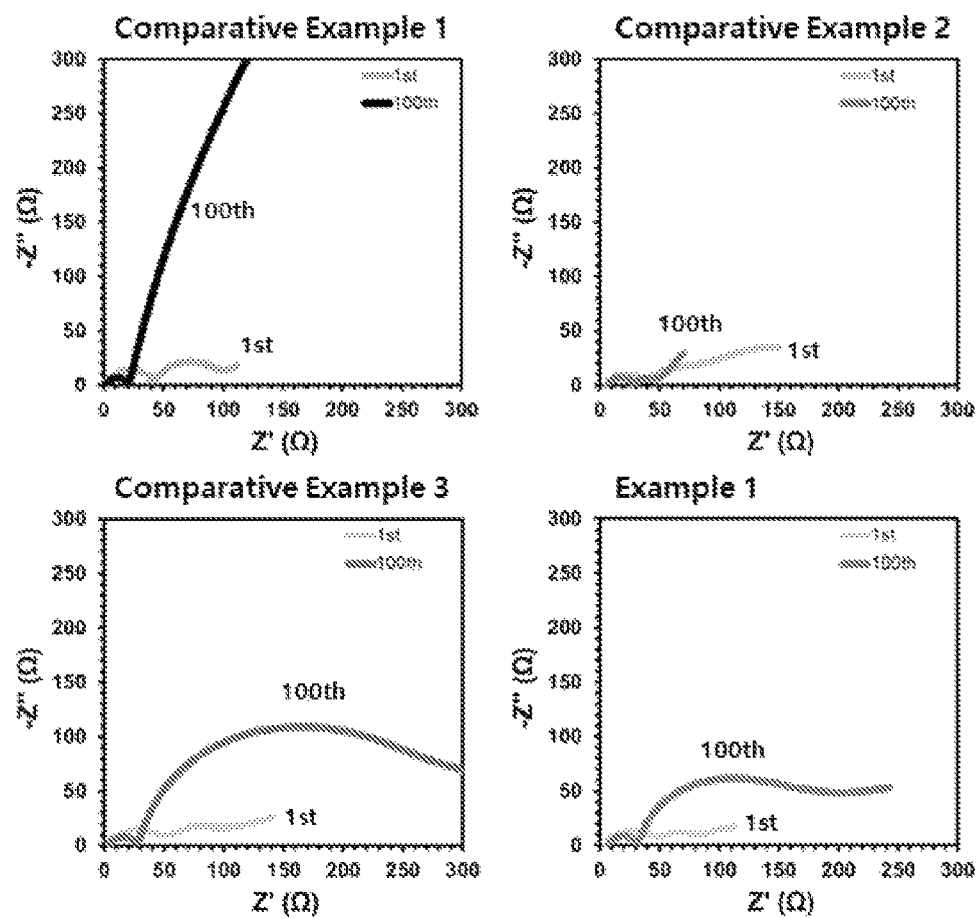

NONINCENDIVE ELECTROLYTE FOR LITHIUM SECONDARY BATTERY, AND LITHIUM SECONDARY BATTERY INCLUDING SAME

CROSS REFERENCE TO RELATED APPLICATION

The present application claims priority to Korean Patent Application No. 10-2020-0083961, Jul. 8, 2020, the entire content of which is incorporated herein for all purposes by this reference.

BACKGROUND OF THE INVENTION

1. Field of the Invention

The present invention relates to a nonincendive electrolyte for lithium secondary batteries and a lithium secondary battery including the same.

2. Description of the Related Art

A lithium secondary battery is composed of a cathode, an anode, a separator, and an electrolyte. Typically, a non-aqueous organic electrolyte with lithium-ion conductivity is used as the electrolyte. Therefore, lithium secondary batteries are vulnerable to fire or explosion. The fire or explosion of a lithium secondary battery poses a significant threat to the safety of users and surrounding environments.

A variety of studies are underway to overcome the risk of fire or explosion of lithium secondary batteries, especially for medium-sized to large-sized lithium secondary batteries used in electric vehicles (EVs) and energy storage systems (ESSs).

As an approach to the solution of such a risk, a method of adding a flame-retardant additive such as phosphazene, phosphate, phosphite, ionic liquid, and an aqueous electrolyte has been suggested. However, this method has the problems of increasing the cost of batteries and of degrading battery performance.

On the other hand, a study on an all-solid-state battery based on a solid electrolyte is also underway. However, this approach has the problems in that the costs for production of electrodes, electrolytes, and all-solid-state cells are higher than those of existing counterparts and the high interfacial resistance at an electrolyte-electrode interface reduces the charge-discharge cycle life of batteries.

That is, both the methods have the advantage of enabling safer lithium secondary batteries but have the disadvantages of reducing battery performance and increasing the production cost of batteries.

Therefore, development of an electrolyte that can improve the safety of lithium secondary batteries without degrading battery performance is still necessary.

Korean Patent Application Publication No. 10-2016-0011548 is a related art literature.

CITATION LIST

Patent Literature (Patent Literature 1) Korean Patent Application Publication No. 10-2016-0011548 (Feb. 1, 2016)

SUMMARY OF THE INVENTION

The present invention has been made to solve the problems occurring in the related art, an objective of the present invention is to provide a nonincendive electrolyte for lithium secondary batteries and a lithium secondary battery including the same, the nonincendive electrolyte being capable of improving the safety of lithium secondary batteries without degrading battery performance.

To accomplish the objective, one aspect of the present invention provides a nonincendive electrolyte for lithium secondary batteries, the electrolyte including a lithium salt and an organic solvent mixture including a first solvent satisfying Chemical Formula 1, a second solvent satisfying Chemical Formula 2, a third solvent satisfying Chemical Formula 3, and a fourth solvent satisfying Chemical Formula 4.

[Chemical Formula 1]

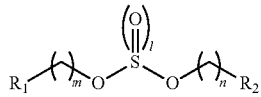

In Chemical Formula 1, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, l is 1 or 2, and m and n are each independently an integer in a range of 0 to 5.

[Chemical Formula 2]

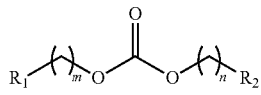

In Chemical Formula 2, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, and m and n are each independently an integer in a range of 0 to 5.

[Chemical Formula 3]

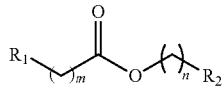

In Chemical Formula 3, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, and m and n are each independently an integer in a range of 0 to 5.

[Chemical Formula 4]

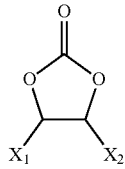

In Chemical Formula 4,
$X_1$ and $X_2$ are each independently hydrogen (H), fluorine (F), C1-C6 alkyl, or C1-C6 alkyl fluoride.

In the aspect, the nonincendive electrolyte for lithium secondary batteries may include: 60% by volume or less (except for 0% by volume) of the first solvent; 80% by volume or less (except for 0% by volume) of the second solvent; 60% by volume or less (except for 0% by volume) of the third solvent; and 10% to 40% by volume of the fourth solvent, relative to 100% by volume of the organic solvent mixture.

In the aspect, in the nonincendive electrolyte for lithium second batteries, the fourth solvent, the first solvent, the second solvent, and the third solvent may be mixed in a ratio of 1:0.0005 to 3:0.0005 to 5:0.0005 to 3.

In the aspect, the first solvent satisfies Chemical Formula 1-1.

[Chemical Formula 1-1]

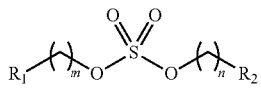

In Chemical Formula 1-1, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, and m and n are each independently an integer in a range of 0 to 3).

In the aspect, the lithium salt may be any one or a mixture of two or more ones selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiC_6H_5SO_3$, $LiN(C_2F_5SO_3)_2$, $LiN(C_2F_5SO_2)_2$, $LiN(CF_3SO_2)_2$, $LiN(FSO_2)$ 2, $LiN(C_xF_{2x+1}SO_2)(C_yF_{2y+1}SO_2)$ (herein, x and y are 0 or natural number), LiCl, LiI, LiSCN, $LiB(C_2O_4)_2$, $LiF_2BC_2O_4$, $LiPF_4$ $(C_2O_4)$, $LiPF_2$ $(C_2O_4)_2$, and $LiP(C_2O_4)_3$.

In the aspect, the concentration of the lithium salt in the nonincendive electrolyte may range from 0.1M to 60M.

In the aspect, the nonincendive electrolyte for lithium secondary batteries may have a self-extinguishing time (SET) of less than 20 seconds/g.

Another aspect of the present invention provides a lithium secondary battery including the nonincendive electrolyte described above.

In this aspect, the lithium secondary battery may be chargeable to a high voltage of 4.15 V to 6 V.

In this aspect, the lithium secondary battery may include a cathode containing a cathode active material, an anode containing an anode active material, the nonincendive electrolyte, and a separator.

In this aspect, the lithium secondary battery may be a lithium-ion secondary battery, a lithium metal secondary battery, or an all-solid-state lithium secondary battery.

The nonincendive electrolyte for lithium secondary batteries, according to the present invention, has a nonincendive property of being flame-retardant or nonflammable by using an organic solvent mixture including a first solvent containing fluorine and sulfur, a second solvent being a linear carbonate-based solvent including fluorine, a third solvent being a linear ester-based solvent including fluorine, and a fourth solvent being a cyclic carbonate-based solvent. Therefore, it is possible to prevent lithium secondary batteries from catching on fire or exploding in the event of disasters such as fire. Therefore, the safety of lithium secondary batteries is greatly improved.

In addition, unlike conventional methods by which the battery safety is improved but the battery performance is degraded, the present invention can provide a nonincendive property without degrading battery performance by using the organic solvent mixture satisfying the combination described above.

BRIEF DESCRIPTION OF THE DRAWINGS

FIG. 1 is a Nyquist plot of the interfacial resistance of a lithium secondary battery, which is measured using electrochemical impedance spectroscopy (EIS).

DESCRIPTION OF THE PREFERRED EMBODIMENTS

Hereinafter, a nonincendive electrolyte for lithium secondary batteries and a lithium secondary battery including the same, according to the present invention, will be described in detail below. Embodiments described below are presented as examples to sufficiently convey the spirit of the present invention to those skilled in the art. Therefore, the present invention is not limited to the accompanying drawings, but may be embodied in many other forms. The drawings may be exaggeratedly illustrated to clarify the idea of the present invention. If there is no other definition for the technical and scientific terms used herein, they have the meaning commonly understood by those ordinarily skilled in the art to which the present invention pertains, and a description of known functions and configurations that may unnecessarily obscure the gist of the present invention will be omitted.

Commercial electrolytes for lithium secondary batteries are flammable and vulnerable to fire and explosion, thereby posing a threat to the safety of users and surrounding environments.

To overcome this problem, flame-retardant additives such as phosphazenes, phosphates, phosphites, and ionic liquids are used, or all-solid-state batteries based on a solid electrode are suggested. However, both the conventional methods have the problems of degrading battery performance and of increasing the cost of batteries while improving the safety of batteries.

The inventors of the present application have studied to develop an electrolyte that can improve the safety of lithium secondary batteries while preventing the degradation of battery performance and, as a result, have found that such an electrolyte can be obtained by mixing four different solvents.

A nonincendive electrolyte for lithium secondary batteries, according to the present invention, includes a lithium salt and an organic solvent mixture prepared by mixing a first solvent satisfying Chemical Formula 1, a second solvent satisfying Chemical Formula 2, a third solvent satisfying Chemical Formula 3, and a fourth solvent satisfying Chemical Formula 4.

[Chemical Formula 1]

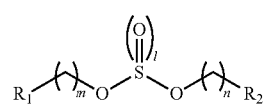

In Chemical Formula 1, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, l is 1 or 2, and m and n are each independently an integer in a range of 0 to 5.

[Chemical Formula 2]

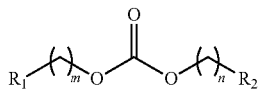

In Chemical Formula 2, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, and m and n are each independently an integer in a range of 0 to 5.

[Chemical Formula 3]

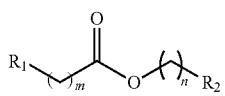

In Chemical Formula 3, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, and m and n are each independently an integer in a range of 0 to 5.

[Chemical Formula 4]

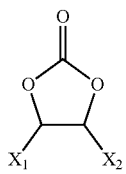

In Chemical Formula 4, $X_1$ and $X_2$ are each independently hydrogen (H), fluorine (F), C1-C6 alkyl, or C1-C6 alkyl fluoride.

The nonincendive electrolyte for lithium secondary batteries, according to the present invention, has a nonincendive property of being flame-retardant or nonflammable by using an organic solvent mixture including a first solvent containing fluorine and sulfur, a second solvent being a linear carbonate-based solvent including fluorine, a third solvent being a linear ester-based solvent including fluorine, and a fourth solvent being a cyclic carbonate-based solvent. Therefore, it is possible to prevent accidents such as a fire or explosion in lithium secondary batteries in the event of disasters such as a fire. That is, the safety of lithium secondary batteries is greatly improved.

Specifically, the nonincendive property depends on a self-extinguishing time (SEC, unit: seconds/g). When SET<6, the material is classified as being nonflammable; when 6<SET<20, the material is classified as being flame-retardant; and when 20 SET, the material is classified as being flammable. The nonincendive electrolyte for lithium secondary batteries, according to the present invention, has a SET of less than 20 seconds/g, more preferably less than 6 seconds/g, and most preferably less than 3 seconds/g. The lower limit of the SEC may be 0 seconds/g.

In addition, unlike conventional methods by which safety is improved but battery performance is degraded, it is possible to achieve a nonincendive property without degrading battery performance by using the organic solvent mixture satisfying the combination described above.

Hereafter, the nonincendive electrolyte for lithium secondary batteries, according to the present invention, will be described in more detail below.

As described above, the nonincendive electrolyte for lithium secondary batteries, according to the present invention, includes a lithium salt and an organic solvent mixture.

Any lithium salt that has been being commonly used by those skilled in the art to which the present invention pertains can be used as the lithium salt in the present invention. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiC_6H_5SO_3$, $LiN(C_2F_5SO_3)_2$, $LiN(C_2F_5SO_2)_2$, $LiN(CF_3SO_2)_2$, $LiN(FSO_2)_2$, $LiN(C_xF_{2x+1}SO_2)(C_yF_{2y+1}SO_2)$ (herein, x and y are 0 or natural number), LiCl, LiI, LiSCN, $LiB(C_2O_4)_2$, $LiF_2BC_2O_4$, $LiPF_4(C_2O_4)$, $LiPF_2(C_2O_4)_2$, and $LiP(C_2O_4)_3$. Any one salt or a mixture of two or more salts selected from the group consisting of the specific examples may be used, but the present invention is not limited thereto.

The concentration of the lithium salt in the nonincendive electrolyte for lithium secondary batteries is regulated to the level commonly used by those skilled in the art to which the present invention pertains. For example, the concentration of the lithium salt may range from 0.1M to 60M, and more preferably range from 0.5M to 10M.

Next, the organic solvent mixture according to one embodiment of the present invention will be described.

As described above, the organic solvent mixture used in one example of the present invention includes a first solvent satisfying Chemical Formula 1, a second solvent satisfying Chemical Formula 2, a third solvent satisfying Chemical Formula 3, and a fourth solvent satisfying Chemical Formula 4.

Particularly, by adjusting the volume % of each solvent appropriately, it is possible to effectively prevent the degradation of lithium secondary batteries while securing a satisfactory flame-retardant or nonflammable level.

As a specific example, the nonincendive electrolyte for lithium secondary batteries includes 60% by volume or less of (except for 0% by volume) of the first solvent, 80% by volume or less (except for 0% by volume) of the second solvent, 60% by volume or less (except for 0% by volume) of the third solvent, and 10% to 40% by volume of the first solvent. More preferably, the nonincendive electrolyte includes 0.1% to 55% by volume of the first solvent, 10% to 75% by volume of the second solvent, 0.1% to 55% by volume of the third solvent, and 15% to 40% by volume of the fourth solvent. Even more preferably, the nonincendive electrolyte includes 1% to 50% by volume of the first solvent, 13% to 70% by volume of the second solvent, 1% to 50% by volume of the third solvent, and 20% to 40% by volume of the fourth solvent. Far even more preferably, the nonincendive electrolyte includes 5% to 45% by volume of the first solvent, 15% to 65% by volume of the second solvent, 5% to 45% by volume of the third solvent, and 20% to 40% by volume of the fourth solvent. Most preferably, the nonincendive electrolyte includes 10% to 45% by volume of the first solvent, 25% to 65% by volume of the second solvent, 10% to 45% by volume of the third solvent, and 20% to 35% by volume of the fourth solvent. When the range is satisfied, not only the nonincendive property (SEC<20 seconds/g) can be achieved but also the battery charge performance can be improved. That is, the discharge capacity of the battery after 100 charge-discharge cycles is greater than 185 mAh/g, the capacity retention rate after 100 charge-discharge cycles is greater than 80%, and the coulombic efficiency is greater than 75%. The upper limit of the discharge capacity is not specifically limited, but it may be, for example, 250 mAh/g.

More preferably, the good battery performance as well as the nonincendive property can be achieved through the control of the content, measured in % by volume, of each of the solvents and the control of a volume ratio of the solvents.

For example, in the electrolyte for lithium secondary batteries, a volume ratio of the fourth solvent: the first solvent: the second solvent: the third solvent is preferably 1:0.0005 to 3:0.0005 to 3:0.0005 to 5:0.01 to 3, more preferably 1:0.01 to 2:0.5 to 4:0.01 to 2, and most preferably 1:0.3 to 1.5:0.5 to 3:0.3 to 1.5. When the range is satisfied, not only the nonincendive property (SEC<20 seconds/g) can be achieved but also the battery charge performance can be improved. That is, the discharge capacity after 100 charge-discharge cycles is greater than 185 mAh/g, the capacity retention rate after 100 charge-discharge cycles is greater than 80%, and the coulombic efficiency is greater than 75%. The upper limit of the discharge capacity is not specifically limited, but it may be, for example, 250 mAh/g.

The first solvent used in one example of the present invention may be a compound containing fluorine and sulfur and satisfying Chemical Formula 1.

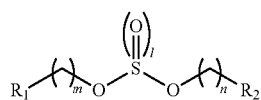

[Chemical Formula 1]

In Chemical Formula, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, 1 is 1 or 2, and m and n are each independently an integer in a range of 0 to 5.

More preferably, the first solvent is a fluorine-containing sulfite-based compound satisfying Chemical Formula 1-1. The addition of this solvent prevents the battery performance from being deteriorated.

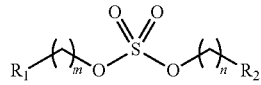

[Chemical Formula 1-1]

In Chemical Formula 1-1, $R_1$ and $R_2$ are each independently methyl ($CH_3$) or methyl fluoride ($CF_xH_{3-x}$, x is an integer in a range of 1 to 3) except for a case where $R_1$ and $R_2$ are both methyl, and m and n are each independently an integer in a range of 0 to 3.

Specific examples of the sulfite-based solvent satisfying Chemical Formula 1 include: bis(fluoromethyl) sulfite, bis(2-fluoroethyl) sulfite, bis(3-fluoropropyl) sulfite, bis(difluoromethyl) sulfite, bis(2,2-difluoroethyl) sulfite, bis(3,3-difluoropropyl) sulfite, bis(trifluoromethyl) sulfite, bis(2,2,2-trifluoroethyl) sulfite, bis(3,3,3-trifluoropropyl) sulfite, methyl(fluoromethyl) sulfite, methyl(2-fluoroethyl) sulfite, methyl(3-fluoropropyl) sulfite, methyl(difluoromethyl) sulfite, methyl(2,2-difluoroethyl) sulfite, methyl(3,3-difluoropropyl) sulfite, methyl(trifluoromethyl) sulfite, methyl(2,2,2-trifluoroethyl) sulfite, methyl(3,3,3-trifluoropropyl) sulfite, ethyl(fluoromethyl) sulfite, ethyl(2-fluoroethyl) sulfite, ethyl(3-fluoropropyl) sulfite, ethyl(difluoromethyl) sulfite, ethyl(2,2-difluoroethyl) sulfite, ethyl(3,3-difluoropropyl) sulfite, ethyl(trifluoromethyl) sulfite, ethyl(2,2,2-trifluoroethyl) sulfite, ethyl(3,3,3-trifluoropropyl) sulfite, propyl(fluoromethyl) sulfite, propyl(2-fluoroethyl) sulfite, propyl(3-fluoropropyl) sulfite, propyl(difluoromethyl) sulfite, propyl(2,2-difluoroethyl) sulfite, propyl(3,3-difluoropropyl) sulfite, propyl(trifluoromethyl) sulfite, propyl(2,2,2-trifluoroethyl) sulfite, propyl(3,3,3-trifluoropropyl) sulfite, (fluoromethyl) (2-fluoroethyl) sulfite, (fluoromethyl) (3-fluoropropyl) sulfite, (fluoromethyl) (difluoromethyl) sulfite, (fluoromethyl) (2,2-difluoroethyl) sulfite, (fluoromethyl) (3,3-difluoropropyl) sulfite, (fluoromethyl) (trifluoromethyl) sulfite, (fluoromethyl) (2,2,2-trifluoroethyl) sulfite, (fluoromethyl) (3,3,3-trifluoropropyl) sulfite, (2-fluoroethyl) (3-fluoropropyl) sulfite, (2-fluoroethyl) (difluoromethyl) sulfite, (2-fluoroethyl) (2,2-difluoroethyl) sulfite, (2-fluoroethyl) (3,3-difluoropropyl) sulfite, (2-fluoroethyl) (trifluoromethyl) sulfite, (2-fluoroethyl) (2,2,2-trifluoroethyl) sulfite, (2-fluoroethyl) (3,3,3-trifluoropropyl) sulfite, (3-fluoropropyl) (difluoromethyl) sulfite, (3-fluoropropyl) (2,2-difluoroethyl) sulfite, (3-fluoropropyl) (3,3-difluoropropyl) sulfite, (3-fluoropropyl) (trifluoromethyl) sulfite, (3-fluoropropyl) (2,2,2-trifluoroethyl) sulfite, (3-fluoropropyl) (3,3,3-trifluoropropyl) sulfite, (difluoromethyl) (2,2-difluoroethyl) sulfite, (difluoromethyl) (3,3-difluoropropyl) sulfite, (difluoromethyl) (trifluoromethyl) sulfite, (difluoromethyl) (2,2,2-trifluoroethyl) sulfite, (difluoromethyl) (3,3,3-trifluoropropyl) sulfite, (2,2-difluoroethyl) (3,3-difluoropropyl) sulfite, (2,2-difluoroethyl) (trifluoromethyl) sulfite, (2,2-difluoroethyl) (2,2,2-trifluoroethyl) sulfite, (2,2-difluoroethyl) (3,3,3-trifluoropropyl) sulfite, (3,3-difluoropropyl)trifluoromethyl) sulfite, (3,3-difluoropropyl) (2,2,2-trifluoroethyl) sulfite, and (3,3-difluoropropyl) (3,3,3-trifluoropropyl) sulfite. One of the compounds or a mixture of two or more compounds selected from the specific examples may be used as the first solvent.

Specific examples of the sulfate-based solvent satisfying Chemical Formula 1 include bis(fluoromethyl) sulfate, bis(2-fluoroethyl) sulfate, bis(3-fluoropropyl) sulfate, bis(difluoromethyl) sulfate, bis(2,2-difluoroethyl) sulfate, bis(3,3-difluoropropyl) sulfate, bis(trifluoromethyl) sulfate, bis(2,2,2-trifluoroethyl) sulfate, bis(3,3,3-trifluoropropyl) sulfate, methyl(fluoromethyl) sulfate, methyl(2-fluoroethyl) sulfate, methyl(3-fluoropropyl) sulfate, methyl(difluoromethyl) sulfate, methyl(2,2-difluoroethyl) sulfate, methyl(3,3-difluoropropyl) sulfate, methyl(trifluoromethyl) sulfate, methyl(2,2,2-trifluoroethyl) sulfate, methyl(3,3,3-trifluoropropyl) sulfate, ethyl(fluoromethyl) sulfate, ethyl(2-fluoroethyl) sulfate, ethyl(3-fluoropropyl) sulfate, ethyl(difluoromethyl) sulfate, ethyl(2,2-difluoroethyl) sulfate, ethyl(3,3-difluoropropyl) sulfate, ethyl(trifluoromethyl) sulfate, ethyl(2,2,2-trifluoroethyl) sulfate, ethyl(3,3,3-trifluoropropyl) sulfate, propyl(fluoromethyl) sulfate, propyl(2-fluoroethyl) sulfate, propyl(3-fluoropropyl) sulfate, propyl(difluoromethyl) sulfate, propyl(2,2-difluoroethyl) sulfate, propyl(3,3-difluoropropyl) sulfate, propyl(trifluoromethyl) sulfate, propyl(2,2,2-trifluoroethyl) sulfate, propyl(3,3,3-trifluoropropyl) sulfate, (fluoromethyl) (2-fluoroethyl) sulfate, (fluoromethyl) (3-fluoropropyl) sulfate, (fluoromethyl) (difluoromethyl) sulfate, (fluoromethyl) (2,2-difluoroethyl) sulfate, (fluoromethyl) (3,3-difluoropropyl) sulfate, (fluoromethyl) (trifluoromethyl) sulfate, (fluoromethyl) (2,2,2-trifluoroethyl) sulfate, (fluoromethyl) (3,3,3-trifluoropropyl) sulfate, (2-fluoroethyl) (3-fluoropropyl) sulfate, (2-fluoroethyl) (difluoromethyl) sulfate, (2-fluoroethyl) (2,2-difluoroethyl) sulfate, (2-fluoroethyl) (3,3-difluoropropyl) sulfate, (2-fluoroethyl) (trifluoromethyl) sulfate, (2-fluoroethyl) (2,2,2-trifluoroethyl) sulfate, (2-fluoroethyl) (3,3,3-trifluoropropyl) sulfate, (3-fluoropropyl) (difluoromethyl) sulfate, (3-fluoropropyl) (2,2-difluoroethyl) sulfate, (3-fluoropropyl) (3,3-difluoropropyl) sulfate, (3-fluoropropyl) (trifluoromethyl) sulfate, (3-fluoropropyl) (2,2,2-trifluoroethyl) sulfate, (3-fluoropropyl) (3,3,3-trifluoropropyl) sulfate, (difluoromethyl) (2,2-difluoroethyl) sulfate, (difluoromethyl) (3,3-difluoropropyl) sulfate, (difluoromethyl) (trifluoromethyl) sulfate, (difluoromethyl) (2,2,2-trifluoroethyl) sulfate, (difluoromethyl) (3,3,3-trifluoropropyl) sulfate, (2,2-difluoroethyl) (3,3-difluoropropyl) sulfate, (2,2-difluoroethyl) (trifluoromethyl) sulfate, (2,2-difluoroethyl) (2,2,2-trifluoroethyl) sulfate, (2,2-difluoroethyl) (3,3,3-trifluoropropyl) sulfate, (3,3-difluoropropyl) (trifluoromethyl) sulfate, (3,3-difluoropropyl) (2,2,2-trifluoroethyl) sulfate, and (3,3-difluoropropyl) (3,3,3-trifluoropropyl) sulfate. One compound or a mixture of two or more compounds selected from the specific examples may be used as the first solvent.

Particularly, the first solvent may be one compound or a mixture of two or more compounds selected from the group consisting of the following sulfate-based compounds in which $R_1$ and $R_2$ are both alkyl fluoride: bis(fluoromethyl) sulfate: bis(2-fluoroethyl) sulfate, bis(3-fluoropropyl) sulfate, bis(difluoromethyl) sulfate, bis(2,2-difluoroethyl) sulfate, bis(3,3-difluoropropyl) sulfate, bis(trifluoromethyl) sulfate, bis(2,2,2-trifluoroethyl) sulfate, and bis(3,3,3-trifluoropropyl) sulfate. Among them, bis(2,2,2-trifluoroethyl) sulfate (FES-fa) is most preferably used in terms of maintaining excellent battery performance while improving a nonincendive property.

The first solvent used in one example of the present invention may be a linear carbonate-based compound satisfying Chemical Formula 2.

[Chemical Formula 2]

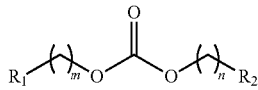

In chemical Formula 2, $R_1$ and $R_2$ are each independently methyl($CH_3$) or methyl fluoride ($CF_xH_{3-x}$, x is an integer in a range of 1 to 3) a case where $R_1$ and $R_2$ are both methyl, and m and n are each independently an integer in a range of 0 to 5.

Specific examples of the second solution satisfying Chemical Formula 2 include: fluorine-containing dimethyl carbonates such as fluoromethylmethyl carbonate, difluoromethylmethyl carbonate, trifluoromethylmethyl carbonate, bis(fluoromethyl) carbonate, bis(difluoromethyl) carbonate, bis(trifluoromethyl) carbonate, (fluoromethyl) (difluoromethyl) carbonate, (fluoromethyl) (trifluoromethyl) carbonate, and (difluoromethyl) (trifluoromethyl) carbonate; fluorine-containing ethylmethyl carbonates such s 2-fluoroethylmethyl carbonate, 2,2-difluoroethylmethyl carbonate, 2,2,2-trifluoroethylmethyl carbonate, (2-fluoroethyl) (fluoromethyl) carbonate, (2-fluoroethyl) (difluoromethyl) carbonate, (2-fluoroethyl) (trifluoromethyl) carbonate, (2,2-difluoroethyl) (fluoromethyl) carbonate, (2,2-difluoroethyl) (difluoromethyl) carbonate, (2,2-difluoroethyl) (trifluoromethyl) carbonate, (2,2,2-trifluoroethyl) (fluoromethyl) carbonate, (2,2,2-trifluoroethyl) (difluoromethyl) carbonate, (2,2,2-trifluoroethyl) (trifluoromethyl) carbonate; and fluorine-containing diethyl carbonates such as 2-fluoroethylethyl carbonate, 2,2-difluoroethylethyl carbonate, 2,2,2-trifluoroethylethyl carbonate, bis(2-fluoroethyl) carbonate, bis (2,2-difluoroethyl) carbonate, bis(2,2,2-trifluoroethyl) carbonate, (2-fluoroethyl) (2,2-difluoroethyl) carbonate, (2-fluoroethyl) (2,2,2-trifluoroethyl) carbonate, and (2,2-difluoroethyl) (2,2,2-trifluoroethyl) carbonate. One compound or a mixture of two or more compounds selected from the specific examples may be used. Preferably, the use of 2,2,2-trifluoroethylmethyl carbonate (TFC) or bis(2,2,2-trifluoroethyl) carbonate (BTFC) provides excellent battery performance while improving nonincendive properties.

The third solvent used in one example of the present invention may be a linear ester-based compound satisfying Chemical Formula 3.

[Chemical Formula 3]

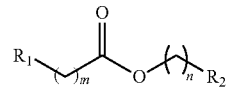

In Chemical Formula 3, $R_1$ and $R_2$ are each independently methyl ($CH_3$) or methyl fluoride ($CF_xH_{3-x}$, x is an integer in a range of 1 to 3) a case where $R_1$ and $R_2$ are both methyl, and m and n are each independently an integer in a range of 0 to 5.

Specifically, as the third solvent satisfying Chemical Formula 3, one compound or a mixture of two or more compounds selected from the group consisting of fluoromethyl acetate, difluoromethyl acetate, trifluoromethyl acetate, 2-fluoroethyl acetate, 2,2-difluoroethyl acetate, 2,2,2-trifluoroethyl acetate, fluoromethyl propionate, difluoromethyl propionate, trifluoromethyl propionate, 2-fluoroethyl propionate, 2,2-difluoroethyl propionate, and 2,2,2-trifluoroethyl propionate. Specifically, 2,2,2-trifluoroethyl acetate (TFEA) or 2,2,2-trifluoroethyl propionate (TFEP) may be most preferably used to maintain good battery performance.

The fourth solvent used in one example of the present invention may be a cyclic carbonate-based compound satisfying Chemical Formula 4.

[Chemical Formula 4]

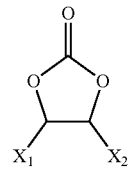

In Chemical Formula 4, $X_1$ and $X_2$ are each independently hydrogen (H), fluorine (F), C1-C6 alkyl, or C1-C6 alkyl fluoride.

Specifically, for example, the fourth solvent satisfying Chemical Formula 4 is one compound or a mixture of two or more compounds selected from the group consisting of ethylene carbonate (EC), propylene carbonate (PC), fluoroethylene carbonate, 4,4-difluoroethylene carbonate, 4,5-difluoroethylene carbonate, 4-methyl-5-fluoroethylene carbonate, 4-methyl-5,5-difluoroethylene carbonate, 4-(fluoromethyl)ethylene carbonate, 4-(difluoromethyl)ethylene carbonate, 4-(trifluoromethyl) ethylene carbonate, 4-(2-fluoroethyl)ethylene carbonate, 4-(2,2-difluoroethyl) ethylene carbonate, and 4-(2,2,2-trifluoroethyl)ethylene carbonate. Especially, propylene carbonate (PC) is most preferably used to maintain good battery performance.

In addition, another aspect of the present invention relates to a lithium secondary battery including the nonincendive electrolyte described above. Since the lithium salt and the organic solvent mixture are the same as described above, a duplicate description will be omitted.

More specifically, the lithium secondary battery includes a cathode containing a cathode active material, an anode containing an anode active material, the nonincendive electrolyte, and a separator.

More specifically, the lithium secondary battery includes: a cathode containing a cathode active material; an anode containing an anode active material; the nonincendive electrolyte including the lithium salt and the organic solvent mixture including the first solvent satisfying Chemical Formula 1, the second solvent satisfying Chemical Formula 2, the third solvent satisfying Chemical Formula 3, and the fourth solvent satisfying Chemical Formula 4; and a separator.

Materials that have been commonly used as the cathode, anode, and separator in the industry to which the present invention pertains can be used without special limitation.

In an example of the present invention, $LiCoO_2$, $LiMnO_2$, $LiNiO_2$, $LiNi_{1-x}Co_xO_2$, $LiNi_{1-x-y}Co_xMn_yO_2$, $LiNi_{1-x-y}Co_xM_yO_2$ (M is a divalent or trivalent metal or a transition metal), $wLi_2MnO_3 \cdot (1-w)LiNi_{1-x-y}Co_xM_yO_2$, $LiMn_{2-x}M_xO_4$ (M is a transition metal) or $LiFePO_4$, $LiMnPO_4$, $LiCoPO_4$, $LiFe_{1-x}M_xPO_4$ (M is a transition metal), $Li_{1.2}Mn_{(0.8-a)}M_aO_2$ (M is a divalent or trivalent metal or a transition metal), $Li_2N_{1-x}M_xO_3$ (N is a divalent, trivalent, or tetravalent metal or a transition metal, and M is a divalent or trivalent metal or a transition metal), $Li_{1+x}N_{y-z}M_zO_2$ (N is Ti or Nb, and M is V, Ti, Mo, or W), $Li_4Mn_{2-x}M_xO_5$ (M is a metal or a transition metal), $Li_xM_{2-x}O_2$ (M is a metal such as Ti, Zr, Nb, or Mn or a transition metal), or $Li_2O/Li_2Ru_{1-x}M_xO_3$ (M is a metal or a transition metal) is used as the cathode active material. However, those examples are presented only for illustrative purposes, and any known material for a cathode active material can be used without specific limitation.

The cathode may further include a conductive material and a binder.

The conductive material is used to impart the electrode with conductivity, and any material intrinsically having electric conductivity without undergoing a chemical change can be used without specific limitation. Specific examples of the conductive material include: graphite; carbon-based materials such as carbon black, acetylene black, Ketjenblack®, channel black, furnace black, lamp black, summer black, carbon fiber; carbon nanotube, carbon nanowire, and graphene; powders of metals such as copper, nickel, aluminum, and silver; conductive whiskeys such as zinc oxide and potassium titanate; and conductive polymers such as polyphenylene derivatives. The exemplary materials may be used solely or in combination of two or more thereof. However, the examples are presented only for illustrative purposes, and any known conductive material can be used.

The binder enhances the bond between the particles of the cathode active material or the bond between the cathode active material and a current collector. Specific examples of the binder include polyvinylidene fluoride (PVDF), polyimide (PI), polyacrylic acid (PAA), polyvinyl alcohol (PVA), carboxymethyl cellulose (CMC), starch, hydroxypropyl cellulose, regenerated cellulose, polyvinylpyrrolidone (PVP), tetrafluoroethylene, polyethylene, polypropylene, ethylene-propylene-diene polymer (EPDM), sulfonated-EPDM, styrene-butadiene rubber, fluor rubber, and various copolymers thereof. The exemplary materials may be used solely or in combination of two or more ones thereof. However, the materials are presented only for illustrative purposes, and any known material as the binder can be used without specific limitation.

In one example of the present invention, like the cathode, the anode may be prepared by directly applying an anode active material to a copper current collector, or by a method of forming an anode active material film on a support through casting, detaching the anode active material film from the support, and laminating the anode active material film on a copper current collector.

For the anode, lithium, lithium alloy, or any anode active material capable of intercalating/deintercalating lithium ions may be used. Specifically, as the anode active material, coke, artificial graphite, natural graphite, soft carbon, hard carbon, a combusted product of an organic high molecular compound, carbon fiber, graphene, silicon, a silicon oxide, tin, a tin oxide, germanium, a graphite composite containing silicon, a silicon oxide, tin, a tin oxide, or germanium, $Li_4Ti_5O_{12}$, or $TiO_2$ may be used. However, these materials are presented only for illustrative purposes. Therefore, any known material that can be used as the cathode active material may be used without specific limitation.

In one example of the present invention, the separator may be a single layer structure made of polyethylene, polypropylene, or polyvinylidene fluoride. Alternatively, the separator may be a multi-layer structure including two or more layers. For example, the separator may be a double-layer separator including polyethylene and polypropylene layers, or a triple-layer separator including polyethylene, polypropylene, polyethylene layers. However, these are presented only for illustrative purposes, and any known separator may be used.

Furthermore, the lithium secondary battery according to the present invention has the advantage of improved electrochemical oxidation stability due to the inclusion of the nonincendive electrolyte so that the lithium secondary battery can be charged to a higher charge voltage than lithium secondary batteries including existing commercial electrolytes, which are usually charged to a voltage of 4.1 to 4.2 V. Specifically, the lithium secondary battery according to the present invention can be charged to a voltage of 4.1 V to 6. Furthermore, the increased charge voltage increases the amount of lithium ions that are intercalated/deintercalated. Therefore, the capacity and energy density of the lithium secondary battery can be increased.

The lithium secondary battery according to the present invention may be a lithium-ion secondary battery, a lithium metal secondary battery, or an all-solid-state lithium secondary battery. The lithium secondary battery according to the present invention may be used in portable electronic devices such as smartphones, wearable electronic devices, power tools, electric vehicles (EV), energy storage systems (ESSs), electric two-wheel vehicles such as electric bicycles and electric scooters, or electric golf carts.

In addition, the lithium secondary battery according to the present invention may be fabricated in various shapes including a coin shape, a box shape, a cylinder shape, and a pouch shape.

The nonincendive electrolyte for lithium secondary batteries and the lithium secondary battery, according to the present invention, will be described in more detail with reference to various specific examples. However, the specific examples described are presented only for illustrative purposes and are intended to limit the present invention. The present invention can be embodied in other forms in addition to the forms presented by the specific examples.

In addition, unless otherwise defined, all technical and scientific terms have the same meaning as that is generally understood by the ordinarily skilled in the art to which the present invention pertains. The terms used in the description of the specification of the present application are only intended to effectively describe specific examples and are not intended to limit the present invention. The units of the amounts of additives, which are not specifically stated herein, may be % by weight.

Example 1

Bis(2,2-trifluoroethyl) sulfate (FES-fa), methyl(2,2-trifluoroethyl) carbonate (TFC), 2,2-trifluoroethylpropionate (TFEP), and propylene carbonate (PC) were mixed in a volume ratio of 3:2:2:3 to prepare an organic solvent mixture.

$LiPF_6$ was added to the organic solvent mixture to be a concentration of 1M to prepare a 1M $LiPF_6$/FES:TFC:TFEP:PC electrolyte.

Example 2

All the processes were carried out in the same manner as in Example 1 except that bis(2,2,2-trifluoroethyl) carbonate (BTFC) was used instead of TFC.

Example 3

All the processes were carried out in the same manner as in Example 1 except that 2,2,2-trifluoroethyl butyrate (TFEB) was used instead of TFEP.

Example 4

All the processes were carried out in the same manner as in Example 1 except that FES-fa, TFC, TFEP, and PC were mixed in a volume ratio of 6:0.5:0.5:3.

Example 5

All the processes were carried out in the same manner as in Example 1 except that FES-fa, TFC, TFEP, and PC were mixed in a volume ratio of 1:3:3:3.

Comparative Example 1

Ethylene carbonate (EC) and ethyl methyl carbonate (EMC) were mixed in a mixing ratio of 3:7 to prepare an organic solvent mixture, and an electrolyte material is added thereto in the same manner as in Example 1 to prepare a conventional electrolyte of 1M $LiPF_6$/EC:EMC.

Comparative Example 2

All the processes were carried in the same manner as in Example 1 except that FES and PC were mixed in a volume ratio of 7:3.

Comparative Example 3

All the processes were carried in the same manner as in Example 1 except that TFC, TFEP, and PC were mixed in a volume ratio of 3.5:3.5:3.

Comparative Example 4

All the processes were carried in the same manner as in Example 1 except that FES-fa, TFEP, and PC were mixed in a volume ratio of 3:4:3.

Comparative Example 5

All the processes were carried in the same manner as in Example 1 except that FES-fa, TFC, and PC were mixed in a volume ratio of 3:4:3.

TABLE 1

| | First solvent (Sulfur-containing solvent) | Second solvent (Linear carbonate) | Third solvent (Linear ester) | Fourth solvent (Cyclic carbonate) | Volume ratio |
|---|---|---|---|---|---|
| Example 1 | FES-fa | TFC | TFEP | PC | 3:2:2:3 |
| Example 2 | FES-fa | BTFC | TFEP | PC | 3:2:2:3 |
| Example 3 | FES-fa | TFC | TFEB | PC | 3:2:2:3 |
| Example 4 | FES-fa | TFC | TFEP | PC | 6:0.5:0.5:3 |
| Example 5 | FES-fa | TFC | TFEP | PC | 1:3:3:3 |
| Comparative Example 1 | — | EMC | — | EC | 7:3 |
| Comparative Example 2 | FES-fa | — | — | PC | 7:3 |
| Comparative Example 3 | — | TFC | TFEP | PC | 3.5:3.5:3 |
| Comparative Example 4 | FES-fa | — | TFEP | PC | 3:4:3 |
| Comparative Example 5 | FES-fa | TFC | — | PC | 3:4:3 |

[Characterization]

Assessment Method

1) Self-extinguishing time (SET, seconds/g): each of the electrolytes prepared as in Examples 1 to 5 and Comparative Examples 1 to 5 was ignited by a torch, and the self-extinguishing time (SEC) per gram of each of the electrolytes was measured after the torch was removed. The electrolyte having an SEC of less than 6 (SEC<6) is classified as being nonflammable, the electrolyte having an SEC greater than 6 and less than 20 (6<SET<20) is classified as being flame-retardant, and the electrolyte having an SEC equal to or greater than 20 (20 SET) is classified as being flammable.

2) Charge/discharge test 1: 2016 coin lithium batteries, each being composed of a lithium metal anode, a $LiNi_{0.6}Co_{0.2}Mn_{0.2}O_2$ cathode, one of the electrolytes prepared as in Examples 1 to 5 and Comparative Examples 1 to 5, and a separator, were fabricated.

The lithium batteries containing the respective electrolytes underwent 100 charge cycles of 1 C and 2.5 to 4.6 V. After that, the specific gravimetric capacity per gram and the initial coulombic efficiency under 0.1 C formation conditions of each lithium battery were measured.

In addition, the capacity retention rate of each lithium battery was calculated according to an equation described below.

Capacity retention rate (%)=(discharge capacity of 100th cycle/discharge capacity of first cycle)×100.

3) Interfacial resistance: the interfacial resistance of each lithium battery was measured after one charge-discharge cycle and 100 charge-discharge cycles using electrochemical impedance spectroscopy (EIS). The results were plotted in the Nyquist plot as shown in FIG. 1.

4) Charge/discharge test 2: 2032 coin lithium batteries, each being composed of a graphite anode, a $LiNi_{0.6}Co_{0.2}Mn_{0.2}O_2$ cathode, one of the electrolytes prepared as in Example 1 and Comparative Example 1, and a separator, were fabricated.

The lithium batteries containing the respective electrolytes underwent 100 charge cycles of 1 C and 2.5 to 4.6 V. After that, the specific gravimetric capacity per gram and the initial coulombic efficiency under 0.1 C formation conditions of each lithium battery were measured.

TABLE 2

| | SET (Sec/g) | Nonflammable/ flammable | Discharge capacity (1 C) (mAh/g) | Capacity retention rate (1 C) (%) | Initial coulombic efficiency (%) |
|---|---|---|---|---|---|
| Example 1 | 0 | Nonflammable | 195 | 86 | 83 |
| Example 2 | 0 | Nonflammable | 188 | 83 | 86 |
| Example 3 | 0 | Nonflammable | 192 | 86 | 87 |
| Example 4 | 0 | Nonflammable | 187 | 83 | 78 |
| Example 5 | 0 | Nonflammable | 189 | 83 | 86 |
| Comparative Example 1 | 60 | Flammable | 183 | 75 | 91 |
| Comparative Example 2 | 0 | Nonflammable | 176 | 46 | 90 |
| Comparative Example 3 | 0 | Nonflammable | 183 | 82 | 88 |
| Comparative Example 4 | 3 | Nonflammable | 187 | 80 | 81 |
| Comparative Example 5 | 0 | Nonflammable | 188 | 85 | 77 |

As shown in Table 2, an existing commercial electrolyte as in Comparative Example 1 has a self-extinguishing time (SEC) of 60 seconds/g meaning being flammable. On the other hand, the electrolytes as in Examples 1 to 5 and Comparative Examples 2 to 5 exhibited an SEC of less than 6 seconds/g meaning being nonflammable although they contain 30% by volume of propylene carbonate (PC) which is known as a flammable substance.

In particular, the electrolytes as in Examples 1 and 3 exhibited an 1 C discharge capacity of 190 mAh/g or more, a 1 C capacity retention rate of 86% or more, and an initial coulombic efficiency of 83% or more. That is, these electrolytes exhibited good battery performance as well as had a nonflammable property. In contrast, the electrolytes in Comparative Examples 2 to 5 had a nonflammable property but exhibited reduced battery performance as compared with the electrolytes as in Examples.

The present invention has been described with reference to some specific examples and characters. However, the specific examples and characteristics are only for illustrative purposes and are not intended to limit the scope of the present invention, and it will be appreciated that various modifications and changes to the examples are possible from the above description by those skilled in the art to which the present invention pertains.

Therefore, the spirit of the present invention is not limited to the specific examples described above, and all forms defined by the appended claims and all equivalents and modifications thereto fall within the scope of the present invention.

What is claimed is:

1. A nonincendive electrolyte for lithium secondary batteries, the electrolyte comprising:
   a lithium salt; and
   an organic solvent mixture including a first solvent satisfying Chemical Formula 1, a second solvent satisfying Chemical Formula 2, a third solvent satisfying Chemical Formula 3, and a fourth solvent satisfying Chemical Formula 4,

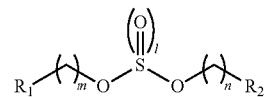

[Chemical Formula 1]

in Chemical Formula 1, $R_1$ and $R_2$ are each independently methyl or methyl fluoride except for a case where $R_1$ and $R_2$ are both methyl, 1 is 1 or 2, and m and n are each independently an integer in a range of 0 to 5,

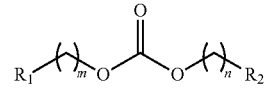

[Chemical Formula 2]

in Chemical Formula 2, $R_1$ and $R_2$ are each independently methyl or methyl fluoride except for a case where $R_1$ and $R_2$ are both methyl, and m and n are each independently an integer in a range of 0 to 5,

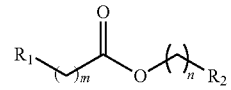

[Chemical Formula 3]

in Chemical Formula 3, $R_1$ and $R_2$ are each independently methyl or methyl fluoride except for a case where $R_1$ and $R_2$ are both methyl, and m and n are each independently an integer in a range of 0 to 5,

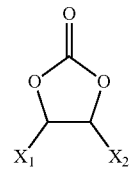

[Chemical Formula 4]

in Chemical Formula 4, $X_1$ and $X_2$ are each independently hydrogen, fluorine, C1-C6 alkyl, or C1-C6 alkyl fluoride, wherein the methyl fluoride is $CF_xH_{3-x}$ and x is an integer in a range of 1 to 3 wherein the electrolyte comprises, relative to 100% by volume of the organic solvent mixture, 60% by volume or less excluding 0% by volume of the first solvent, 80% by volume or less excluding 0% by volume of the second solvent, 60% by volume or less excluding 0% by volume of the third solvent, and 10% to 40% by volume of the fourth solvent, and wherein the fourth solvent, the first solvent, the second solvent and the third solvent are mixed in a volume ratio of 1:0.0005 to 3:0.0005 to 5:0.0005 to 3.

2. The electrolyte of claim 1, wherein the first solvent satisfies Chemical Formula 1-1,

[Chemical Formula 1-1]

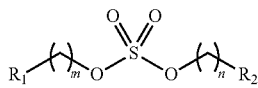

in Chemical Formula 1-1, $R_1$ and $R_2$ are each independently methyl or methyl fluoride except for a case where $R_1$ and $R_2$ are both methyl, and m and n are each independently an integer in a range of 0 to 3.

3. The electrolyte of claim 1, wherein the lithium salt comprises any one or a mixture of two or more ones selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_3SO_3$, $LiC_6H_5SO_3$, $LiN(C_2F_5SO_3)_2$, $LiN(C_2F_5SO_2)_2$, $LiN(CF_3SO_2)_2$, $LiN(FSO_2)_2$, $LiN(C_xF_{2x+1}SO_2)(C_yF_{2y+1}SO_2)$, x and y being 0 or natural number, LiCl, LiI, LiSCN, $LiB(C_2O_4)_2$, $LiF_2BC_2O_4$, $LiPF_4(C_2O_4)$, $LiPF_2(C_2O_4)_2$, and $LiP(C_2O_4)_3$.

4. The electrolyte of claim 3, wherein the concentration of the lithium salt in the nonincendive electrolyte ranges from 0.1M to 60M.

5. The electrolyte of claim 1, wherein the nonincendive electrolyte has a self-extinguishing time of less than 20 seconds/g.

6. A lithium secondary battery comprising the electrolyte of claim 1.

7. The lithium secondary battery of claim 6, wherein the lithium secondary battery is chargeable to a high voltage of 4.15 to 6 V.

8. The lithium secondary battery of claim 6, wherein the lithium secondary battery comprises a cathode including a cathode active material, an anode including an anode active material, the nonincendive electrolyte, and a separator.

9. The lithium secondary battery of claim 6, wherein the lithium secondary battery is a lithium-ion secondary battery, a lithium metal secondary battery, or an all-solid-stage lithium secondary battery.

* * * * *